United States Patent

Nomiyama et al.

(10) Patent No.: US 8,925,896 B2
(45) Date of Patent: Jan. 6, 2015

(54) POSITIONER

(71) Applicant: Azbil Corporation, Tokyo (JP)

(72) Inventors: Takashi Nomiyama, Tokyo (JP); Masaki Namikawa, Tokyo (JP)

(73) Assignee: Azbil Corporation, Tokyo (JP)

( * ) Notice: Subject to any disclaimer, the term of this patent is extended or adjusted under 35 U.S.C. 154(b) by 36 days.

(21) Appl. No.: 13/912,770

(22) Filed: Jun. 7, 2013

(65) Prior Publication Data

US 2013/0327426 A1  Dec. 12, 2013

(30) Foreign Application Priority Data

Jun. 8, 2012 (JP) ................................. 2012-131256

(51) Int. Cl.
*F16K 31/02* (2006.01)
*F16K 37/00* (2006.01)
*F16K 31/12* (2006.01)
*F16K 31/36* (2006.01)
*G05D 7/00* (2006.01)
*G05D 11/00* (2006.01)

(52) U.S. Cl.
CPC ......... *F16K 37/0075* (2013.01); *F16K 37/0066* (2013.01)
USPC ............... 251/129.04; 137/487.5; 137/488; 700/282

(58) Field of Classification Search
CPC ..................... F16K 37/0075; F16K 37/0066
USPC ................. 251/129.04; 137/487.5, 488, 487; 700/282
See application file for complete search history.

(56) References Cited

U.S. PATENT DOCUMENTS

| 5,549,137 | A | 8/1996 | Lenz et al. |
| 5,558,115 | A | 9/1996 | Lenz et al. |
| 5,573,032 | A | 11/1996 | Lenz et al. |
| 5,758,686 | A * | 6/1998 | Ohtsuka et al. ............ 137/492.5 |
| 6,155,283 | A * | 12/2000 | Hansen et al. ..................... 137/1 |
| 2002/0040284 | A1* | 4/2002 | Junk ............................. 702/189 |
| 2011/0240891 | A1* | 10/2011 | Inagaki ..................... 251/30.01 |
| 2012/0248356 | A1* | 10/2012 | Okuda et al. ............ 251/129.15 |

FOREIGN PATENT DOCUMENTS

| JP | 3595554 B2 | 12/2004 |
| WO | 95/06276 A1 | 3/1995 |

* cited by examiner

*Primary Examiner* — John Rivell
*Assistant Examiner* — Josephine Trinidad-Borges
(74) *Attorney, Agent, or Firm* — Troutman Sanders LLP

(57) ABSTRACT

A positioner includes a modeling portion that, having input/output characteristics that model an electropneumatic converter, inputs a control signal from a control calculating portion to calculate an estimated value for an input air pressure that is inputted from the electropneumatic converter into a pilot relay, and a shift magnitude calculating portion that calculates a shift magnitude from the equilibrium state of the pilot relay, from the estimated value for the input air pressure, which is calculated by the modeling portion, and the output air pressure that is outputted from the pilot relay. The control calculating portion determines the control signal from an actual opening signal, an opening setting signal, and the shift magnitude from the equilibrium state of the pilot relay, and outputs it to the electropneumatic converter.

3 Claims, 5 Drawing Sheets

POSITIONER

CROSS REFERENCE TO RELATED APPLICATION

This application claims priority to Japanese Patent Application No. 2012-131256, filed on Jun. 8, 2012, the entire content of which being hereby incorporated herein by reference.

FIELD OF TECHNOLOGY

The present invention relates to a positioner for controlling the opening of a valve.

BACKGROUND

Conventionally, positioners for controlling the openings of valves have been, for example, positioners wherein the critical components have been configured as illustrated in FIG. 4. In this figure, 200 (200A) is a positioner, and 300 is a valve, where the valve 300 is provided with a position sensor 10 for detecting a position that indicates the degree of opening of the valve.

The positioner 200A is provided with an electric current-SP converting portion 1, a control calculating portion 2, an electropneumatic converter 3, a pilot relay 4, and a valve opening calculating portion 5.

In the positioner 200A, the electric current-SP converting portion 1 converts into an opening setting signal SP an input signal that is sent, as a signal of between 4 and 20 mA, from a higher level device. The valve opening calculating portion 5 calculates the current valve opening of the valve 200A from the position that indicates the opening of the valve, detected by the position sensor 10, and outputs, as an actual opening signal PV, a signal depending on the calculated opening. The control calculating portion 2 calculates the difference between the opening setting signal SP from the electric current-SP converting portion 1 and the actual opening signal PV from the valve opening calculating portion 5, and outputs, as a control signal MV, an electric signal obtained through performing PID control calculations on the difference.

The electropneumatic converter 3 converts into an air pressure (a nozzle back pressure) Pn the control signal MV from the control calculating portion 2. The pilot relay 4 uses the pneumatic signal Pn from the electropneumatic converter 3 as an input air pressure and amplifies this input air pressure Pn to produce an output air pressure Po, and outputs it to the operating device 11 of the valve 300. Doing so causes the air of the air pressure Po to flow into a diaphragm chamber within the operating device 11, to adjust the opening of the valve portion 12.

In this positioner 200A, that which is subject to control by the control calculating portion 2 includes the electropneumatic converter 3 and the pilot relay 4, which apply the air flow rate and the air pressure to the valve 300. If the characteristics of the electropneumatic converter 3 and the pilot relay 4 were linear, and were well-behaved characteristics, then such a control method would be adequate; however, in practice both the electropneumatic converter and the pilot relay 4 have non-linear elements such as hysteresis and a dead band, and so control is complex. Given this, because in the positioner 200A the feedback information is only the actual opening signal PV of the valve 300, if a change does not appear in the actual opening signal PV, then there is no change in the control output (the control signal MV). Because of this, controllability is a problem. Given this, a positioner with improved controllability has been proposed in Japanese Patent 3595554 ("the JP '554").

FIG. 5 is a diagram illustrating schematically the positioner shown in the JP '554. In this positioner 200 (200B), the differential value dPo/dt of the output air pressure Po that is outputted from the pilot relay 4, as a pressure differential value, is fed back to the control calculating portion 2 in addition to the actual opening signal PV that indicates the current degree of opening of the valve 300. The output air pressure Po changes more rapidly than the actual opening signal PV. Because of this, feeding back the magnitude of change of the output air pressure Po makes it possible to estimate, in advance, the change that will occur in the actual opening signal PV. This enables superior control when compared to that of feeding back only the opening information.

However, in the positioner 200B disclosed in the JP '554, even though the differential information for the output air pressure Po (the control pressure for the diaphragm portion of the operating device 11) of the pilot relay 4, wherein the response is faster than that of the actual opening of the valve 300, is fed back, when there is a noise, and the like, in the differential information, the output becomes extremely large. Because of this, there is a problem in that the control tends to become unstable.

The present invention was created in order to solve the problem as set forth above, and an aspect thereof is to provide a positioner that improves substantially responsiveness without a loss of settling performance in control. Moreover, another object is to provide a positioner that, in addition to the improved responsiveness, does not have the danger of falling into undesired control, such as oscillating.

SUMMARY

In order to achieve the aspect set forth above, the present invention is a positioner including a control calculating portion that inputs an opening setting signal for a valve, sent from a higher level device, and an actual opening signal that indicates the current degree of opening of the valve, to produce a control signal from the opening setting signal and the actual opening signal, an electropneumatic converter that converts the control signal from the control calculating portion into an air pressure, and a pilot relay that uses, as an input air pressure, the air pressure converted by the electropneumatic converter, to amplify the input air pressure to produce an output air pressure, to output to driving unit that drives the valve. The positioner further includes a modeling portion that, having input/output characteristics that model the electropneumatic converter, inputs the control signal from the control calculating portion to calculate an estimated value for the input air pressure that is inputted from the electropneumatic converter into the pilot relay, and a shift magnitude calculating portion that calculates a shift magnitude from the equilibrium state of the pilot relay, from the estimated value for the input air pressure that is calculated by the modeling portion and the output air pressure that is outputted from the pilot relay. The control calculating unit determines the control output to the electropneumatic converter from the actual opening signal, the opening setting signal, and the shift magnitude from the equilibrium state of the pilot relay.

While the output air pressure of the pilot relay is determined in response to the input air pressure, when there has been a change in the input air pressure from the equilibrium state, there will be a delay until the output air pressure response. The input air pressure into the pilot relay will have non-linear elements relative to the control output, and there will be lag time. Because of this, when this is used in control there is the risk of producing undesired control, such as oscillating.

Given this, in the present invention a modeling portion is provided that has input/output characteristics that model the electropneumatic converter, to input the control signal from the control calculating portion in order to calculate an estimated value for the input air pressure that will be inputted from the electropneumatic converter into the pilot relay, where a magnitude of shift from the equilibrium state of the pilot relay is calculated from the estimated value of the input air pressure, calculated by the modeling portion, and the output air pressure that is outputted from the pilot relay, to determine the control output to the electropneumatic converter by taking into consideration the magnitude of shift from the equilibrium state of the pilot relay, that is, prior to the actual change, the magnitude of change in the output air pressure, which changes in response to a change in the input air pressure into the pilot relay, is estimated in advance, to thereby improve the responsiveness without a loss of settling performance in control. Moreover, this eliminates concerns regarding producing undesired control, such as oscillating.

For example, in the present invention the magnitude of shift from the equilibrium state of the pilot relay is calculated as Po−(K•Pn∼−F). Here Pn∼ is the estimated value for the input air pressure Pn that is inputted into the pilot relay, calculated by the modeling portion, Po is the output air pressure, F is the force required before Po starts to change, and K is dPo/dPn.

Furthermore, in the present invention the estimated value for the input air pressure that is inputted into the pilot relay, calculated by the modeling portion, is corrected based on the estimated value of the input air pressure that is inputted into the pilot relay, calculated by the modeling portion, and the actual value for the input air pressure that is inputted into the pilot relay from the electropneumatic converter. The characteristics of the electropneumatic converter have a tendency to change based on the temperature and on blockages in the pneumatic circuit. Given this, it will be a difference between the estimated value Pn∼ for the input air pressure Pn that is calculated by the modeling portion and the actual input air pressure Pn. When this difference is produced, then even if the input air pressure Pn and the output air pressure Po are well matched, the evaluation will be that they are not well matched, and this will be fed back into the control signal. Because of this, the estimated value Pn∼ for the input air pressure Pn, calculated by the modeling portion, is corrected through, for example, the application of a value wherein the differences have been integrated, for example, based on the estimated value Pn∼ for the input air pressure Pn, calculated by the modeling portion, and the actual input air pressure Pn.

Given the present invention, a modeling portion is provided that has input/output characteristics that model the electropneumatic converter, to input the control signal from the control calculating portion in order to calculate an estimated value for the input air pressure that will be inputted from the electropneumatic converter into the pilot relay, where a magnitude of shift from the equilibrium state of the pilot relay is calculated from the estimated value of the input air pressure, calculated by the modeling portion, and the output air pressure that is outputted from the pilot relay, and a control calculating portion to determines the control output from the actual opening signal, the opening setting signal, and the magnitude of shift from the equilibrium state of the pilot relay, and outputs it as a control signal to the electropneumatic converter, and thus, the magnitude of change in the output air pressure, which changes in response to a change in the input air pressure into the pilot relay, is estimated in advance, prior to the actual change, to thereby improve the responsiveness without a loss of settling performance in control. Moreover, an estimated value for the input air pressure, calculated by the modeling portion, is used, thus making it possible to suppress any adverse effects due to non-linear elements or lag time, relative to the control output, in the input air pressure that is inputted into the pilot relay, so that there is no danger of producing undesired control, such as oscillating.

DETAILED DESCRIPTION

Examples according to the present invention will be explained below in detail, based on the drawings.

Example

Figure 1:
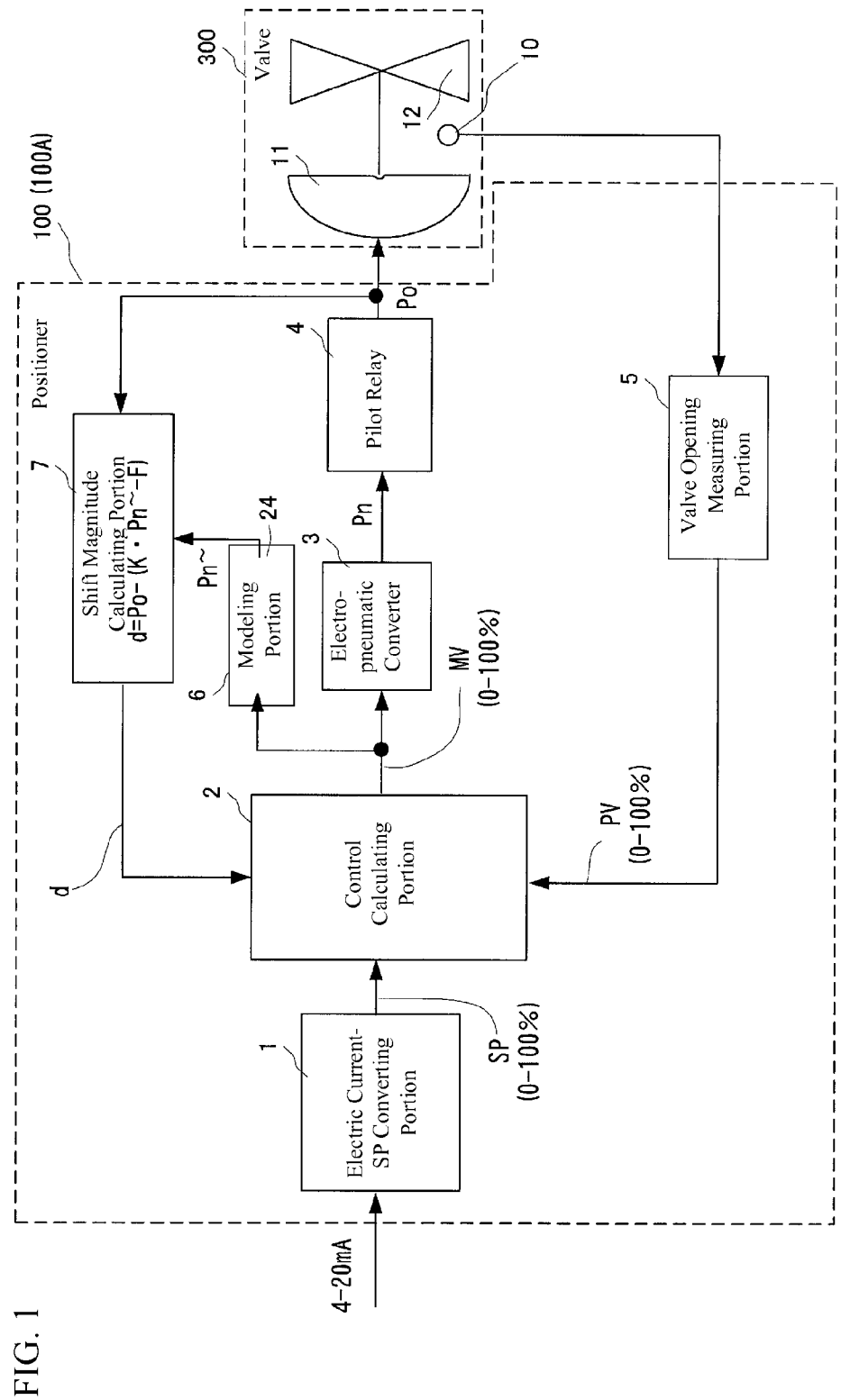
FIG. 1 is a diagram illustrating the structure of the critical components of Example of a positioner according to the present invention.
Figure 4:
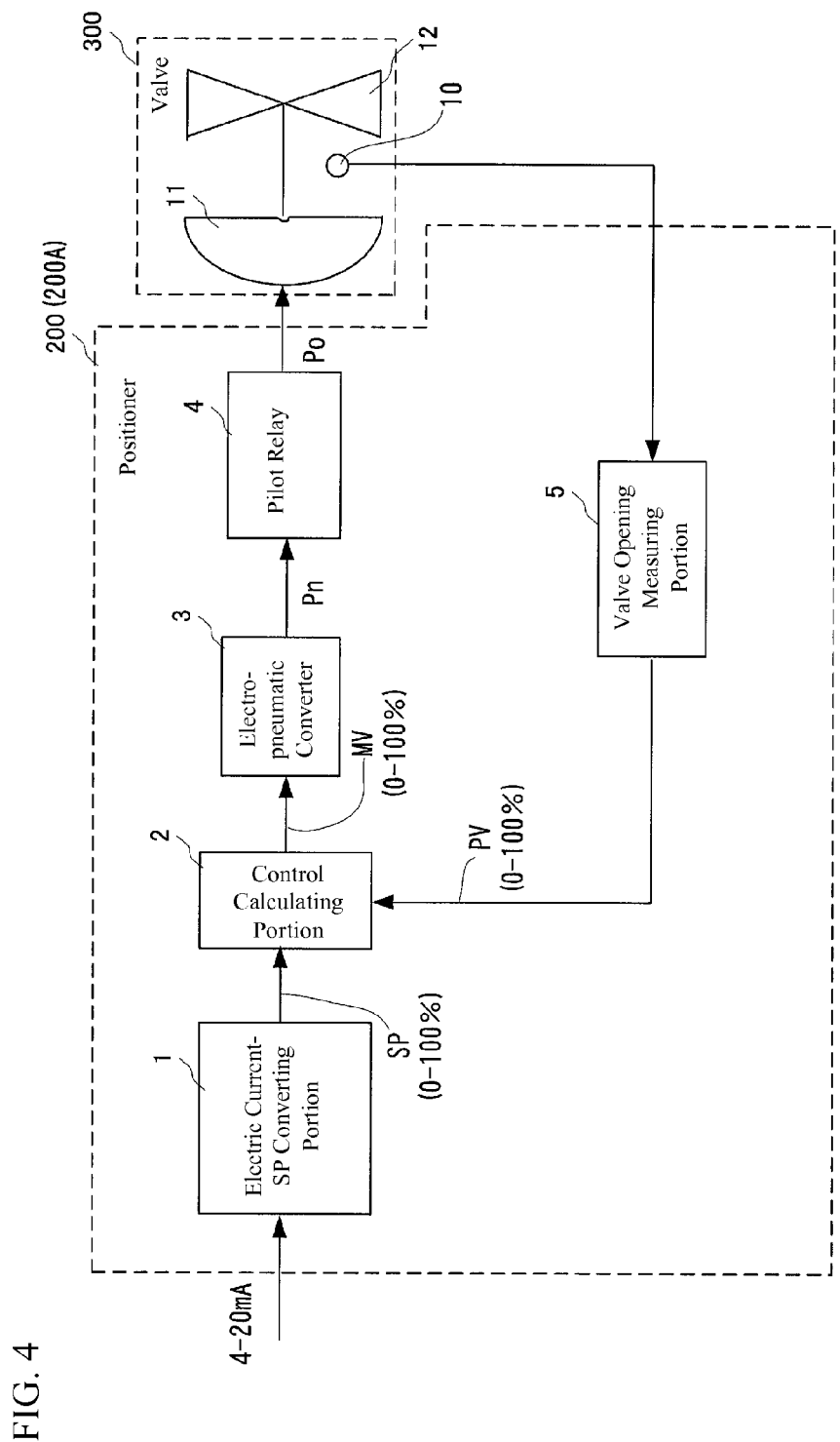
FIG. 4 is a diagram illustrating the critical components in a conventional positioner.
Figure 5:
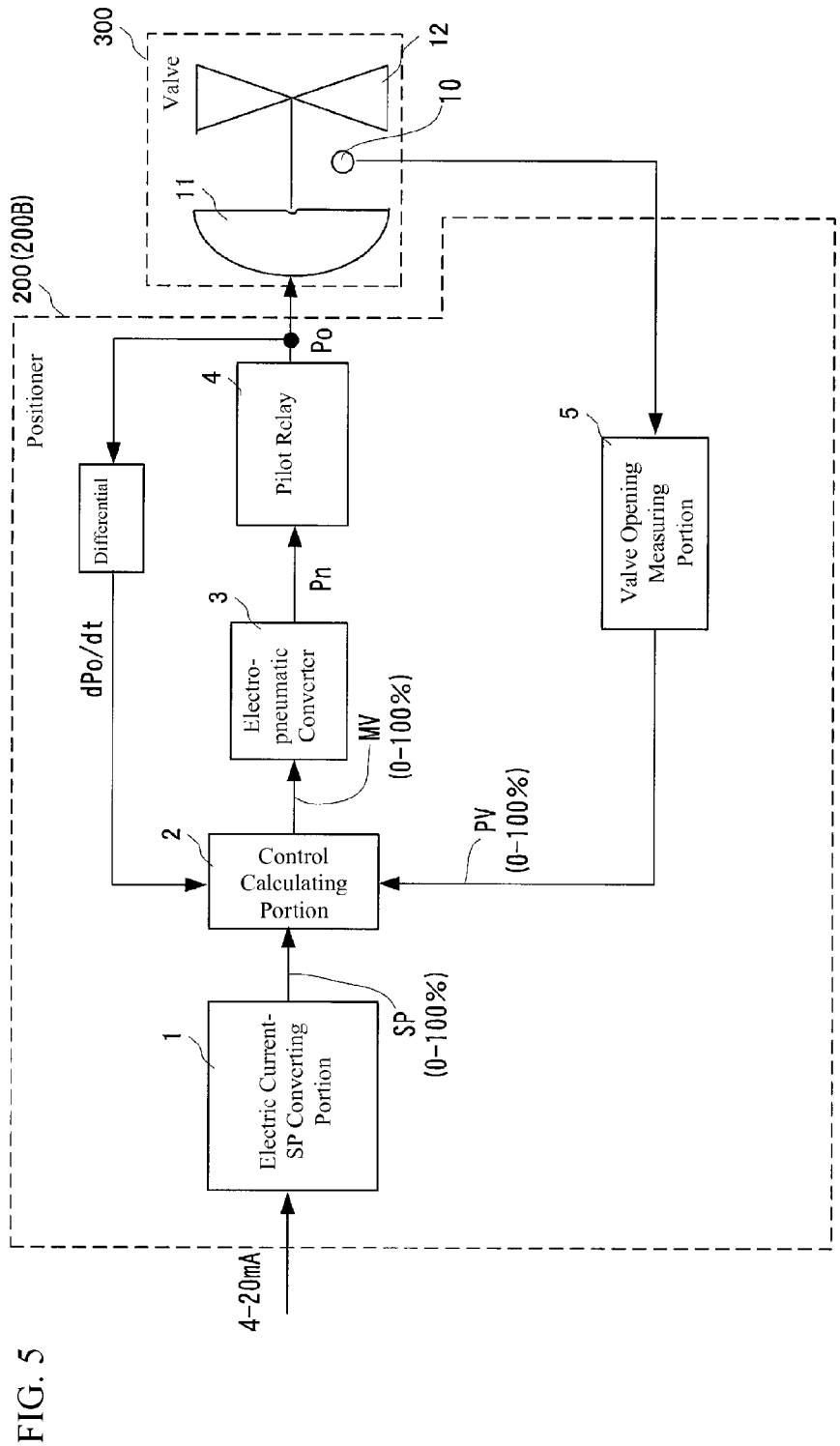
FIG. 5 is a diagram illustrating the critical components in the positioner shown in the JP '554.

FIG. 1 illustrates the structure of the critical components of Example of a positioner according to the present invention. In this figure, codes that are the same as those in FIG. 4 indicate identical or equivalent structural elements as the structural elements explained in reference to FIG. 4, and explanations thereof are omitted. The positioner according to the present invention will be indicated by the code 100 in order to differentiate from a conventional positioner.

In the present example, the positioner 100 (100A) includes a modeling portion 6, which has input/output characteristics wherein the electropneumatic converter 3 has been modeled, for calculating an estimated value Pn∼ for the input air pressure Pn that is inputted into the pilot relay 4 from the electropneumatic converter 3 that inputs a control signal MV from a control calculating portion 2, and a shift magnitude calculating portion 7 to calculate a shift magnitude d from the equilibrium state of the pilot relay 4, from the estimated value Pn∼ for the input air pressure, calculated by the modeling portion 6, and the output air pressure Po that is outputted from the pilot relay 4. It also is provided with a function for determining the control signal MV from the shift magnitude d from the equilibrium state of the pilot relay 4, calculated by the shift magnitude calculating portion 7, and outputting it to the electropneumatic converter 3.

The shift magnitude calculating portion 7 calculates the magnitude of shift d from the equilibrium state of the pilot relay 4 using the calculating equation given in Expression (1), below, from the estimated value Pn∼ for the input air pressure Pn that is inputted into the pilot relay 4, calculated by the modeling portion 6, and the output air pressure Po that is outputted from the pilot relay 4.

$$d = Po - (K \cdot Pn{\sim} - F) \quad (1)$$

Note that Pn~ is the estimated value for the input air pressure Pn that is inputted into the pilot relay 4, calculated by the modeling portion 6, Po is the output air pressure that is outputted from the pilot relay 4, F is the force required before Po starts to change, and K is dPo/dPn.

Figure 2:
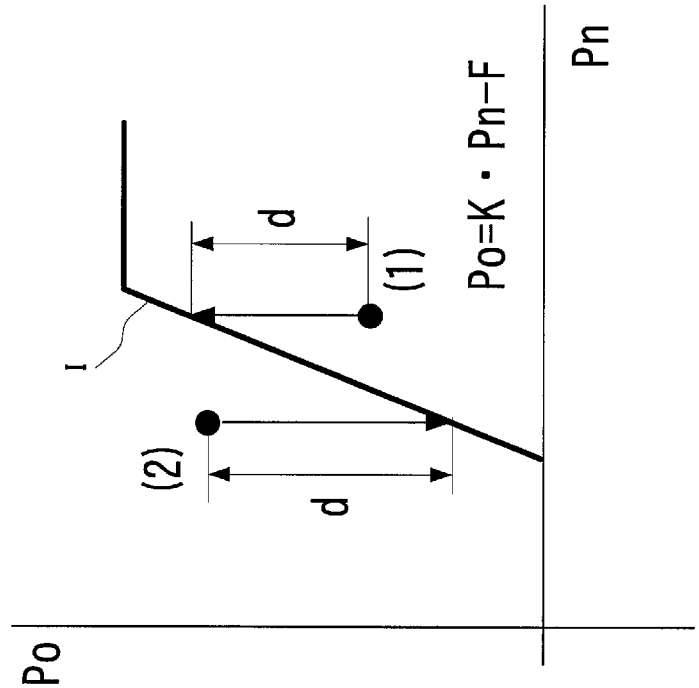
FIG. 2 is a diagram for explaining the magnitude of shift from the equilibrium status of the pilot relay, calculated by the shift magnitude calculating portion of the positioner.

The magnitude of shift d from the equilibrium state of the pilot relay 4, calculated by the shift magnitude calculating portion 7, is estimated, prior to the actual change, the magnitude of change of the output air pressure Po that changes in response to a change in the input air pressure Pn that is inputted into the pilot relay 4. FIG. 2 illustrates the input/output characteristics of the pilot relay 4. The output air pressure Po of the pilot relay 4 changes in accordance with an equation expressed by Po=K•Pn−F, as indicated by the input/output characteristic I. When the relationship of the input air pressure Pn and the output air pressure Po is on this input/output characteristic I, the pilot relay 4 is in the equilibrium state.

In the equilibrium state of the pilot relay 4, the output air pressure Po assumes a value that depends on the input air pressure Pn. However, because the response of the output air pressure Po is delayed when compared to the input air pressure Pn, for some time after a change in the input air pressure Pn there will be a deviation from this input/output characteristic I. In this case, we can consider the cases wherein the current output air pressure Po is such that K•Pn−F>Po and wherein the current output air pressure Po is such that K•Pn−F<Po. In the case that the current output air pressure Po is such that K•Pn−F>Po (the (1) state illustrated in FIG. 2), we can anticipate the output air pressure Po to increase by the magnitude of shift d from the equilibrium state. In the case that the current output air pressure Po is such that K•Pn−F<Po (the (2) state illustrated in FIG. 2), we can anticipate the output air pressure Po to decrease by the magnitude of shift d from the equilibrium state.

Consequently, the magnitude of shift d from the equilibrium state of the pilot relay 4 can be said to be an estimate, prior to an actual change, of the magnitude of change in the output air pressure Po that changes in response to a change in the input air pressure Pn that is inputted into the pilot relay 4. The shift magnitude d from the equilibrium state of the pilot relay 4 is calculated as Po−(K•Pn~−F) in the shift magnitude calculating portion 7, and this calculated shift magnitude d is sent to the control calculating portion 2. The shift magnitude d is an estimate of the amount of change there will be in the output air pressure Po, so by feeding this back it is possible to estimate the change in opening at an earlier stage than when feeding back the amount of change in the output air pressure Po. Because of this, the controllability is improved substantially.

The control calculating portion 2 determines the control signal MV from the actual opening signal PV, the opening setting value SP, and the shift magnitude d from the equilibrium state of the pilot relay 4 that is calculated by the shift magnitude calculating portion 7, and outputs it to the electropneumatic converter 3. Note that the control signal MV is determined through Expression (2), below:

$$MV = Kp \cdot (SP-PV) + \int Ki \cdot (SP-PV)dt + Kd \cdot (dPV/dt) + Km \cdot d \quad (2)$$

Here Kp is the proportional gain, Ki is the integral gain, Kd is the differential gain, and Km is the shift magnitude gain.

In this case, the control calculating portion 2 determines the control output from the actual opening signal PV, the opening setting signal SP, and the shift magnitude from the equilibrium state of the pilot relay 4, and outputs it as the control signal MV to the electropneumatic converter 3, so the amount of change in the output air pressure Po, which changes in response to a change in the input air pressure Pn that is inputted into the pilot relay 4, is estimated prior to the actual change, thus enabling a substantial improvement in responsiveness without a loss of settling performance.

Moreover, because, in the present example, the estimated value Pn~ for the input air pressure Pn that is inputted into the pilot relay 4, calculated by the modeling portion 6, is used, this is able to suppress adverse effects due to the non-linear elements and lag time, relative to the control output, of the input air pressure Pn that is inputted into the pilot relay 4, and thus there is no risk of producing undesired control, such as oscillating.

Another Example

Figure 3:
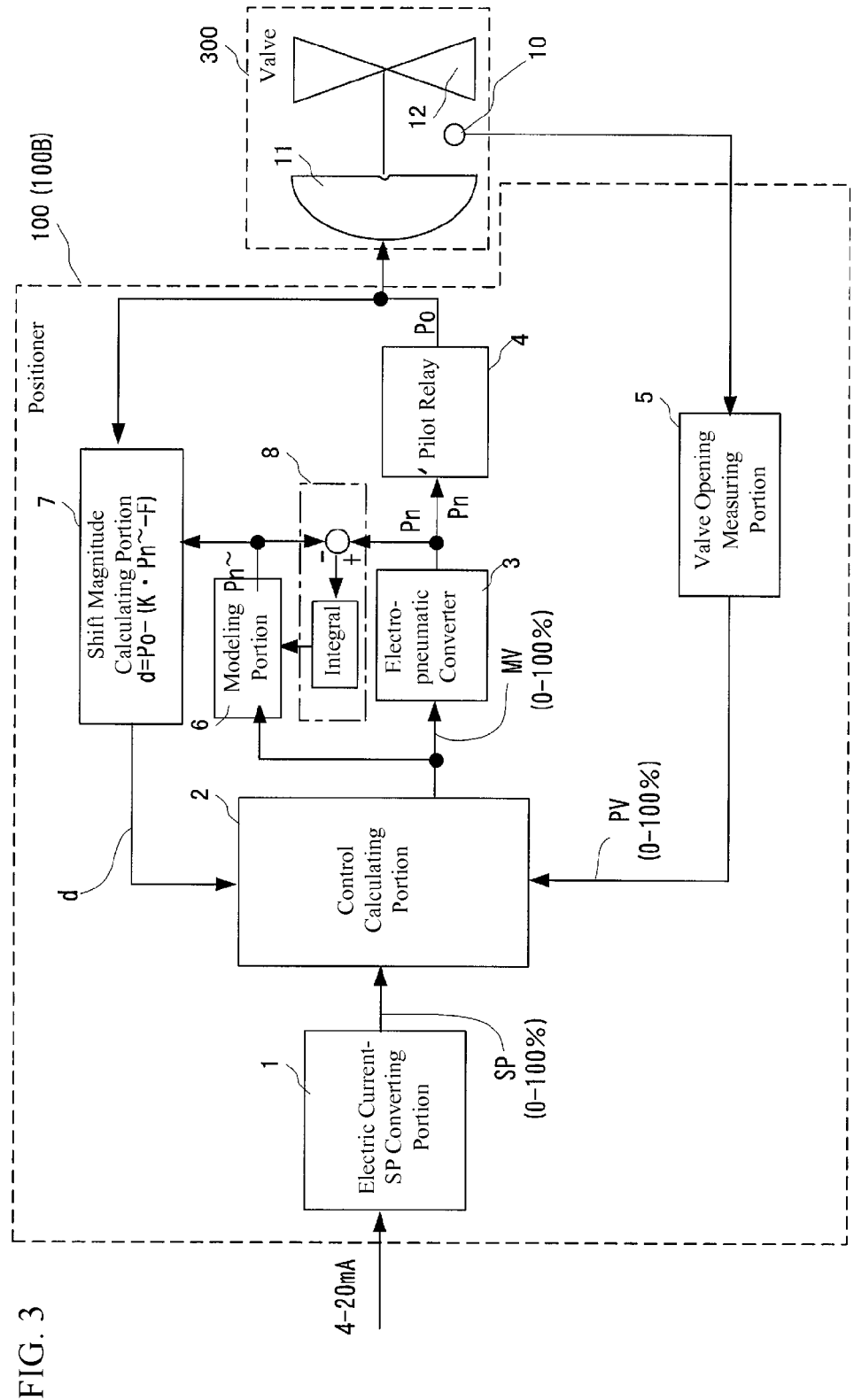
FIG. 3 is a diagram illustrating the structure of the critical components of Another Example of a positioner according to the present invention.

FIG. 3 illustrates the structure of the critical components of Another Example of a positioner according to the present invention. In this figure, codes that are the same as those in FIG. 1 indicate identical or equivalent structural elements as the structural elements explained in reference to FIG. 1, and explanations thereof are omitted.

In the positioner 100B of this Another Example, an estimated value correcting portion 8 is provided, so as to apply to the modeling portion 6 a value that is the integral of the differences between the estimated value Pn~ for the input air pressure Pn of the pilot relay 4 that is calculated by the modeling portion 6 and the actual value Pn for the input air pressure that is inputted into the pilot relay 4 from the electropneumatic converter 3, to correct the estimated value Pn~ for the input air pressure Pn that is inputted into the pilot relay 4, calculated by the modeling portion 6.

The provision of the estimated value correcting portion 8 enables performance of control without impediment even if the estimated value Pn~ of the input air pressure Pn from the modeling portion 6 is different from the actual input air pressure Pn.

That is, the characteristics of the electropneumatic converter 3 tend to change easily with temperature or obstructions in the pneumatic circuit. In such a case, a deviation will be produced between the estimated value Pn~ for the input air pressure Pn from the modeling portion 6 and the actual input air pressure Pn. When this deviation is produced, then even if Po−(K•Pn−F)=0, Po−(K•Pn~−F) will not equal zero, and a steady state error will be produced. In the present example, the correction of the estimated value Pn~ for the input air pressure Pn by the value of the integral of the difference between the estimated value Pn~ for the input air pressure Pn and the actual input air pressure Pn causes the characteristics of the modeling portion 6 to match the actual characteristics of the electropneumatic converter 3, thus enabling control to be performed without impediments even if there is a difference between the estimated value Pn~ for the input air pressure Pn and the actual input air pressure Pn.

Note that while in the Example, set forth above, the shift magnitude d from the equilibrium state of the pilot relay 4 was calculated using Expression (1), above, there is no limitation to this expression. For example, instead the shift magnitude d from the equilibrium state of the pilot relay 4 may be read out from a table wherein the relationships in Expression (1), described above, are stored as data. Moreover, while in the examples set forth above the position sensor 10 was provided outside of the positioner 100, it may instead be provided within the positioner 100.

Furthermore, while in the Another Example, set forth above, a value of an integral of the difference between the estimated value Pn~ for the input air pressure and the actual value Pn for the input air pressure was applied to the modeling portion 6, instead the estimated value Pn~ for the input air pressure and the actual value Pn of the input air pressure may be compared, and a specific quantity may be added to a correcting quantity, or the like.

Furthermore, in the Example and Another Example set forth above, the functions of the control calculating portion 2, the modeling portion 6, the shift magnitude calculating portion 7, the estimated value correcting portion 8, and the like, in the positioner 100, may be embodied through hardware that includes a processor and a storage device and a program, which operates jointly with this hardware, for achieving these functions as a controlling device.

Extended Examples

While the present invention has been explained above in reference to the examples, the present invention is not limited to the examples set forth above. The structures and details in the present invention may be varied in a variety of ways, as can be understood by one skilled in the art, within the scope of technology in the present invention.

The invention claimed is:

1. A positioner comprising:
a control calculating portion that inputs an opening setting signal for a valve, sent from a higher level device, and an actual opening signal that indicates the current degree of opening of the valve, to produce a control signal from the opening setting signal and the actual opening signal;
an electropneumatic converter that converts the control signal from the control calculating portion into an air pressure;
a pilot relay that uses, as an input air pressure, the air pressure converted by the electropneumatic converter, to amplify the input air pressure to produce an output air pressure, and to output to a driving unit that drives the valve;
a modeling portion that, having input/output characteristics that model the electropneumatic converter, inputs the control signal from the control calculating portion to calculate an estimated value for the input air pressure that is inputted from the electropneumatic converter into the pilot relay; and
a shift magnitude calculating portion that calculates a shift magnitude from the equilibrium state of the pilot relay, from the estimated value for the input air pressure, which is calculated by the modeling portion, and the output air pressure that is outputted from the pilot relay, wherein
the control calculating portion determines the control output to the electropneumatic converter from the actual opening signal, the opening setting signal, and the shift magnitude from the equilibrium state of the pilot relay.

2. The positioner as set forth in claim 1, wherein
the shift magnitude calculating portion calculates the shift magnitude from the equilibrium state of the pilot relay as Po−(K·Pn~−F), wherein
Pn~ is an estimated value for the input air pressure Pn that is inputted into the pilot relay, calculated by the modeling portion,
Po is an output air pressure that is outputted from the pilot relay,
F is a force that is required before Po starts to change, and
K is dPo/dPn.

3. The positioner as set forth in claim 1, further comprising:
an estimated value correcting portion that corrects an estimated value for the input air pressure that is inputted into the pilot relay, calculated by the modeling portion, based on the estimated value for the input air pressure that is inputted into the pilot relay, calculated by the modeling portion, and the actual value for the input air pressure that is inputted into the pilot relay from the electropneumatic converter.

* * * * *